Patented Aug. 6, 1946

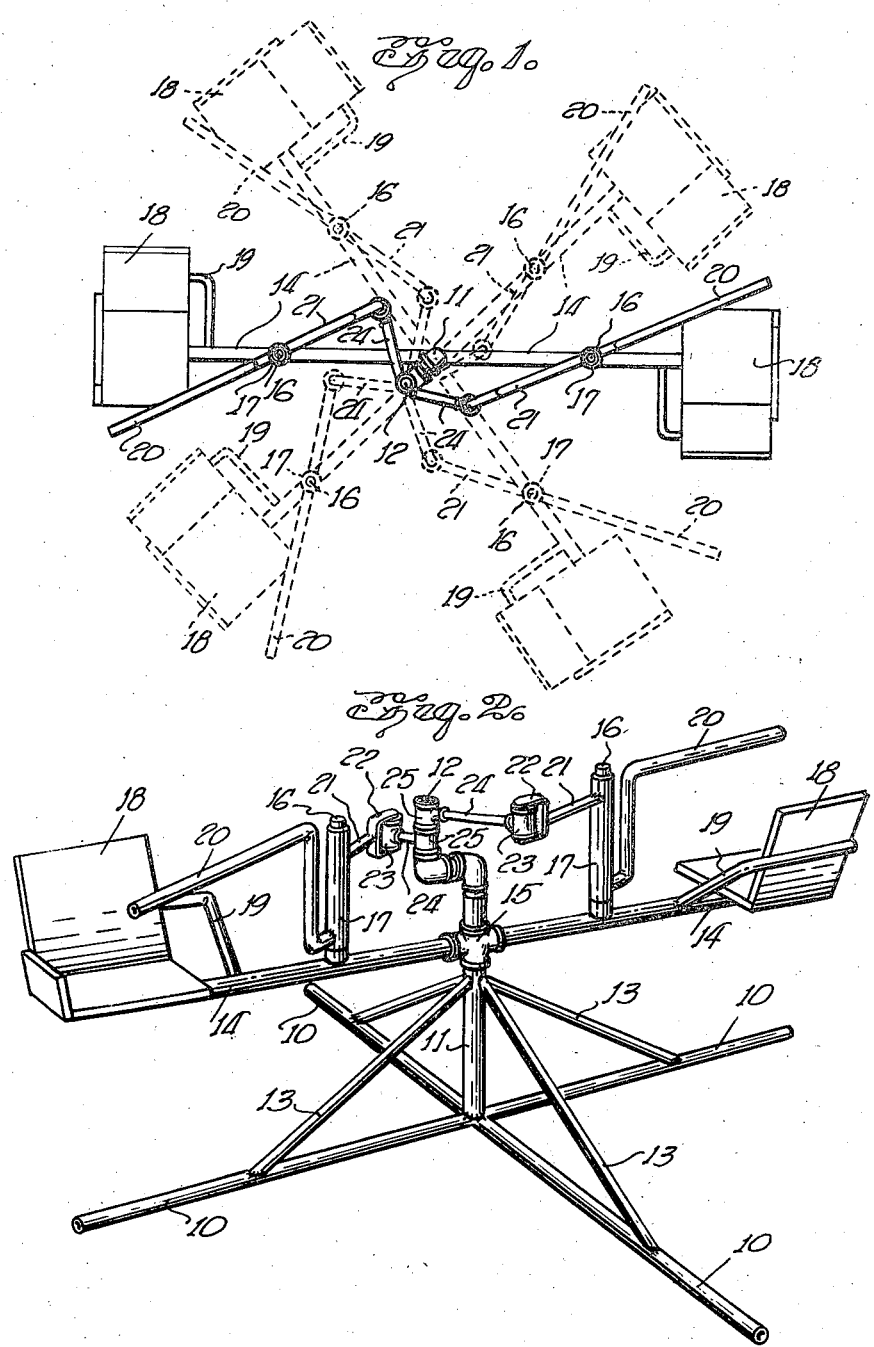

2,405,495

UNITED STATES PATENT OFFICE 2,405,495

AMUSEMENT APPARATUS

Robert B. Franklin, Dallas, Tex., assignor to Playground Equipment Company

Application July 2, 1945, Serial No. 602,699

5 Claims. (Cl. 272—33)

This invention relates to amusement apparatus and more particularly to passenger propelled carousels.

The principal object of the invention is to provide a carousel or merry-go-round, consisting of a supporting base; a riser thereon terminating in a vertical crank pin or offset; a beam rotatably mounted on the riser below the crank, carrying seats on each end; uprights on the beam intermediate the seats and crank pin; rotatable sleeves on the uprights oscillated by handles convenient to the occupants of the seats and pivoted arms forming connection between the sleeves and said crank through which leverage is provided to effect rotative displacement of said beam by reason of the constantly changing radius between said crank pin and sleeves as the beam revolves.

With the foregoing objects as paramount, the invention has further reference to certain features of accomplishment which will become apparent as the description proceeds, taken in connection with the accompanying drawing wherein:

Figure 1 is a plan view, diagrammatically showing in solid and broken lines various positions of the seat supporting beam of the carousel and the mechanism by which rotative displacement thereof is effected, and Figure 2 is a perspective view of a carousel constructed according to the present invention.

In continuing with a more detailed description of the drawing, reference is primarily made to Figure 1 in which 10 denotes a plurality of radial arms constituting the base of the machine, at the intersection of which is mounted a riser 11 whose upper end is formed into a crank 12 by bending; by forming the same with threaded pipe and fittings, as shown or by any other means. The riser 11 is reinforced by brace rods 13, welded at their upper ends to the riser and at their lower ends to the arms 10. Obviously, by making the described parts demountable, they may be dismantled for more compact shipping.

Mounted rotatably on the riser 11 is a crossmember or beam 14, the conventional X-fitting 15 serving, in the present construction, as the bearing. This beam, as apparent in Figure 2, is provided with uprights 16, rigidly mounted thereon in spaced relation to the rotative axis thereof, which is the riser 11. These uprights have sleeves 17 freely mounted thereon, to which further reference will be made presently.

On each end of the beam 14 is mounted a seat 18, reinforced by a brace 19 from the beam 14. An operating handle is formed of a rod or pipe 20 conveniently accessible to an occupant of a seat 18, which is bent into a right angle to lie in a parallel plane to the upright 16, its lower end being again bent inwardly and welded or otherwise secured to the sleeve 17. It is apparent therefore that by moving the handle 20 inwardly and outwardly with respect to the seat 18, the sleeve 17 is oscillated on the upright 16.

Affixed rigidly to the sleeve 17 near its upper end is an arm 21, provided with a yoke 22 at its outer end, which embraces a bearing 23, whose axis is parallel with the upright 16. A second arm or pitman 24 is rigidly affixed to and extends outwardly from a collar 25, mounted rotatably on the crank pin 12 of the riser 11 and is similarly affixed to the bearing 23 midway of its ends.

It is apparent in Figure 2 that two identical arm assemblies are provided to accommodate each of the operating handles 20, although one is elevated slightly above the other with respect to their positions on the crank pin 12.

In operation, each occupant of a seat 18 grasps the handle 20 in front of him, and, upon pushing outwardly thereon, rotates the sleeve 17. Since the handle, sleeve and arm 21 constitute a rigid assembly, movement of the handle either exerts a pull or imposes a thrust on the arm 24, complementary to and through the arm 21, resulting in an eccentric action to rotatably displace the beam 14 and continued manipulation of the handles by both passengers will, of course, keep the beam in motion.

It is obvious that more than one seat carrying frame or beam may be employed to accommodate a group of passengers, by duplicating the eccentric arrangement or by and through a master pitman, attended by connecting rods serving in the capacity of the arms 21—24.

The arrangement shown and described is a variation and improvement on the construction of a carousel described and claimed in applicant's co-pending application, Serial No. 592,372, which has become Patent No. 2,384,906 dated September 18, 1945.

Manifestly, the construction as shown and described is capable of some modification and such modification as may be construed to fall within the scope and meaning of the appended claims is also considered to be within the spirit and intent of the invention.

What is claimed is:

1. A carousel comprising a base and a riser having an eccentric at its upper end, a seat carrying frame rotatably mounted on said riser, uprights on said frame in spaced relation to said riser and carrying means operated by occupants in the seats of said frame and cooperating with said eccentric for exerting a force tangent to said eccentric.

2. An amusement apparatus including a frame mounted for rotation on a vertical axis, having seats on the ends thereof, an eccentric on said axis and means operated by the occupants of said seats to impose a force tangent to said eccentric to effect progressive rotative displacement of said frame on its axis.

3. In an amusement apparatus, a frame mounted for rotation on a vertical axis, seats on said frame, a crank pin rising from said axis, a pair of uprights on said frame opposing said crank pin having sleeves freely mounted thereon, an arm rigidly mounted on and extending outwardly from said sleeve, a second arm pivoted to said first arm and having rotative engagement with said crank pin and means adjacent said seats, operated by the occupants thereof to oscillate said sleeve to effect, through said arms, progressive rotative displacement of said frame.

4. In a merry-go-round, a seat carrying beam mounted on a vertical axis at its midsection, a pin offset in relation to the axis of said beam, an upright on said beam on opposite sides of said axis carrying a freely mounted sleeve, operating handles adjacent the seats or said beam and secured to said sleeves and means intermediate said sleeves and said offset pin, effective upon actuation of said handles to rotate said beam on its axis.

5. A riding device with a hand manipulated machine, including a frame mounted on a combination axle and crank shaft, vertically supported by a base, means to cause said frame to rotate around said axle and crankshaft consisting of handle bars pivoted on said frame and engaging said crankshaft by means of an elbow bearing displacement between said crankshaft and said pivoted handle bar bearing.

ROBERT B. FRANKLIN.